Patented Feb. 23, 1937

2,071,861

UNITED STATES PATENT OFFICE 2,071,861

GIN SAW BLADE AND ITS MANUFACTURE

Raleigh H. Barnes, East Cleveland, and Carl L. Radway, Cuyahoga Heights, Ohio, assignors to The American Steel and Wire Company of New Jersey, a corporation of New Jersey No Drawing. Application January 21, 1935, Serial No. 2,836

6 Claims. (Cl. 148—12)

This invention relates to gin saws and is particularly concerned with gin saw blades made of cold-rolled steel.

In view of its intended use, it is fairly obvious that a good gin saw blade should have an accurately flat and smoothly polished annular body portion provided with projecting teeth at its outer edge, that this body portion should be of substantially uniform thickness throughout and free from hammer-scale or any other kind or scale, that the entire body portion and the teeth should be of substantially uniform composition and of a fine-grained crystalline structure, and that the teeth should be hard, tough and have their points in permanent and accurate alinement. Furthermore, a gin saw blade should be substantially free from internal strain, just as should any other steel article, and its crystalline structure should not be so stressed as to cause brittleness.

A blade of the above characteristics might be made from hot-rolled steel by the use of proper skill. It would, of course, be reasonably free of crystalline stress, and any internal strain could be removed by proper heat-treating. However, the keen competition among the makers of these saws prevents the use of hot-rolled steel because of the costs incidental to so making such a blade.

When cold-rolled steel strip was made commercially available, it was immediately seized upon by manufacturers whose products were of a character requiring a sheet steel that was flat and smoothly polished, because these requirements were filled at a much lower cost than that of hot-rolled steel of a similar character. Consequently, some one soon thought of making gin saw blades of cold-rolled steel, since it appeared that this practice would enable the production of the ideal blade at a reasonably low cost, just as it had enabled other manufacturers to improve their product.

Now it should be understood that cold-rolled steel is not of uniform composition unless the hot-rolled steel from which it is produced is also of uniform composition, and that further hot rolling of such uniform steel to bring it to gage cannot affect its composition any more than can cold rolling, since there is no chemical action involved. Furthermore, cold rolling alone does not produce a fine-grained crystalline structure. The grain size is dependent on the grain size of the hot-rolled steel and can be changed only by heating. Hence, grain size can be controlled to some extent by hot rolling but not by cold rolling, and cold-rolled steel is not necessarily fine-grained unless produced from hot-rolled fine-grained steel.

It should also be understood that though hot rolling may result in a steel that is internally strained because of rolling and uneven cooling, it does not usually result in a steel having a highly stressed crystalline structure. Also, that though cold rolling alone cannot remove internal strain, it inevitably results in a steel having a highly stressed crystalline structure of a decidedly preferred orientation. Therefore, cold-rolled steel produced from internally strained hot-rolled steel may actually be inferior for use in gin saw blades to steel which is further hot-rolled to bring it to gage, since it may not only be internally strained but its crystalline structure will be highly stressed and will have a decidedly preferred orientation.

The foregoing discussion shows that cold-rolled steel, as such, is suited to gin saw blade use primarily because of its surface finish and accurate dimensional characteristics. To this might be added its extreme density and homogeneity resulting from the terrific pressures usually exerted while rolling it. However, it is apparent that a gin saw blade characterized only by being made of cold-rolled steel leaves much to be desired, and that some other method must be used other than only one comprising the steps of cold-rolling steel to gage, instead of hot-rolling it, and then forming in the usual manner, if a blade having the characteristics described at the beginning of this specification is to result.

It is the object of the present invention to provide a gin saw blade made of cold-rolled steel and which, in addition, does not whip in service and whose teeth remain permanently alined, all to a reasonable degree. A further object is to provide a method of making gin saw blades of cold-rolled steel which is sufficiently comprehensive to enable the ordinary steel producer and saw manufacturer to cooperate to produce gin saw blades at least approximating the requirements of a really good blade and which are certainly much better than those resulting from the simple method described in the above paragraph.

An example of such a method will now be described, after which will come a disclosure of a gin saw blade having, at least, the above characteristics.

The first step in the method is to procure a good grade of plain high-carbon steel of, say, .75 to .85 carbon. Its inherent grain size should be reasonably uniform, and it should be of a reasonably uniform chemical composition throughout, it being practically impossible to subsequently change these factors by any known means. This steel is then hot-rolled to a strip of a thickness substantially greater than that of the gage of the blades desired or, for instance, about twice as great. This strip is then carefully heat-treated to remove any strain introduced during this hot-rolling.

Then this strip is cold-rolled according to accepted practice, excepting such changes in speed and pressure which might be necessitated by the high carbon content of the steel. This cold rolling is carried on so as to bring the strip at least almost to the ultimate gage required, and results in what is known as cold-rolled steel. Its crystalline structure is now highly stressed and shows a decided preferred orientation in the direction of its rolling. Except as to finish, dimensional accuracy, density and homogeneity, it is not particularly suited to be made into gin saw blades, even though it may have been reduced completely to the gage required. It is not uniformly stiff or tough in all directions, but is so only in its rolling direction, and its grain size is not necessarily fine.

Heretofore the cold-rolled strip was heated to a point below the critical range of its steel for a prolonged period at some time during its working, which was usually before 50 per cent of the cold rolling required had been done, and cold rolling was then resumed, not only to bring it to gage, but primarily for the purpose of hardening it, the idea apparently being that this preserved the cold-rolled characteristics considered so desirable. In other words, the heating resulted in a softening which had to be corrected by this further cold rolling, while the latter again reproduced the characteristics of cold-rolled steel. This second cold-rolling necessarily effected a material reduction and was considered a material factor in bringing the strip to final gage. Blades formed from the resulting product whipped more in one radial direction than in another and their teeth did not stay permanently alined, statements to the contrary notwithstanding.

Returning to the new method, the strip now cold-rolled almost or completely to gage, is passed through a continuous furnace and from there directly through a cooling zone. This furnace is so heated and the speed of the strip so regulated that the latter is heated into or above the critical range of its steel, and the rate of cooling is such that a sorbitic structure results having sufficient hardness to accommodate the requirements of a gin saw blade without necessitating the formerly indispensable further cold-rolling.

If the strip is not cold-rolled completely to gage, it may be heat treated without observing undue care as to the formation of scale. After this treatment it is pickled to remove any scale and is then cold-rolled to gage. However, the majority of the cold rolling must be done prior to the heat treating, the latter cold rolling being reserved for finishing and polishing purposes rather than for a material working such as might reimpart the undesirable characteristics of cold-rolled steel.

If the strip was cold-rolled completely to gage prior to the described heat treatment, the latter should be done so that the brightness and smoothness of the strip is not destroyed. Thus, the strip may be heated or both heated and cooled in a non-oxidizing atmosphere, the result being the same as described above except that pickling and finishing cold rolling are unnecessary.

Both practices result in a steel strip that is practically free of either strain or stress and which has a grain structure practically free from any preferred orientation, this strip being thereby completely distinguished from cold-rolled steel strip as such.

The gin saw blades are formed from this steel strip in the same manner as was done when using cold-rolled steel strip or, for that matter, when using hot-rolled steel sheets excepting that the straightening operation is not necessary because of the naturally flat character of strip produced by cold rolling.

A gin saw blade produced by this method is characterized by being practically uniformly stiff and tough in all radical directions, and may be easily recognized by the usual tests for these equalities. Hence, it does not whip unevenly in service, nor do its teeth become misalined, because these teeth are all of the same toughness and therefore resist shock to the same degree. A plain cold-rolled steel blade lacks these features.

Such a blade is further characterized by having a grain structure which is oriented practically or completely at random, showing that the steel from which it is made was heated above its critical range after a majority of the cold working has been done. This blade may also be distinguished in that it is made from cold-rolled high-carbon sorbitic steel or, in other words, that the cold-rolled high-carbon steel has a microscopic structure indicating that it was hardened by heat treatment rather than by cold-rolling. The blade is also noteworthy in that it also possesses the really desirable features of cold-rolled steel.

It now is apparent that a gin saw blade has been provided which has all the features of the ideal blade, except that no mention has been made about grain size. That is because this is a variable determined by the duration of the period during which the steel is heated above its critical range, in combination with the inherent grain size of the steel itself. The longer this duration and the higher the temperature the larger the grain size, and this is about the only rule that can be honestly set forth. The fact that cold-rolling produced the steel may be a factor, some people claiming that highly stressed steel showing a decidedly preferred orientation, recrystallizes into what are momentarily very fine grains, but cold rolling is certainly not a factor in the absence of subsequent heat treating.

In any event, any one following the method here disclosed can produce gin saw blades having not only the characteristics defined at the beginning of this specification, but also which are uniformly stiff in all radial directions and of uniform toughness throughout, and this cannot be accomplished only by the use of cold-rolled steel.

The term "high-carbon steel" used throughout this specification and the following claims is to be construed as meaning any steel having sufficient carbon to effect the hardness required, it being understood that certain alloy steels may have a lower carbon content than plain carbon steel.

We claim:

1. A gin saw blade made of cold-rolled steel and which is characterized by having a grain structure indicating that said steel was heated above its critical range after at least the majority of the cold rolling required to bring it to gage had been done.

2. A gin saw blade made of cold-rolled high-carbon steel and which is sufficiently hard for its intended use, said saw being characterized in that the grain structure of said steel indicates that the latter was hardened by heat treatment instead of by cold rolling.

3. A gin saw blade made of cold-rolled high-carbon sorbitic steel having a grain structure practically free from any preferred orientation.

4. A method of making gin saw blades including hot rolling high-carbon steel into a strip of a thickness substantially greater than that of the gage required for said blades, cold-rolling said strip so as to bring it at least almost to said gage, heating said strip into or above the critical range of said steel, again cold rolling said strip so as to bring it completely to said gage, providing this is required, and then forming said saws from said strip.

5. A method of making gin saw blades including hot rolling high-carbon steel into a strip of a thickness substantially greater than that of the gage required for said blades, heat treating said strip to remove strain, cold rolling said strip so as to bring it at least almost to said gage, heating said strip into or above the critical range of said steel and then cooling it, said heating and cooling being proportioned as to their respective duration, speed and relative timing so as to impart a sorbitic structure to the steel of said strip, again cold rolling said strip sufficiently to bring it to gage, providing this is required, and then forming said saws from said strip.

6. A method of making gin saw blades, including hot rolling high-carbon steel to a strip of a thickness substantially greater than that of the gage required for said blades, cold-rolling said strip to said gage, heating said strip into or above the critical range of said steel under non-oxidizing conditions and forming said saws from said strip.

RALEIGH H. BARNES.
CARL L. RADWAY.